Aug. 21, 1962  H. A. PRICE  3,049,911
CELL FOR TESTING HYDROCARBON FUEL
Filed Nov. 12, 1959
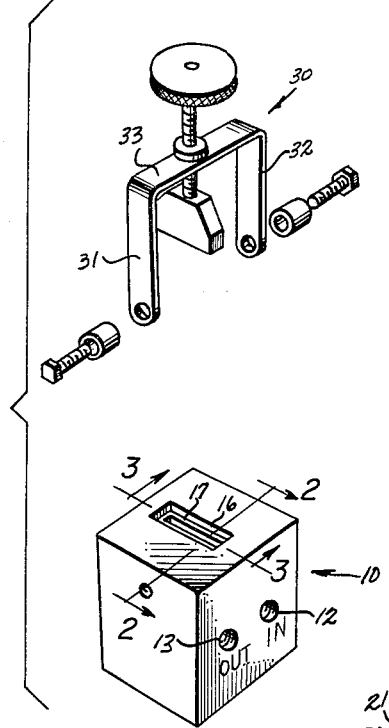
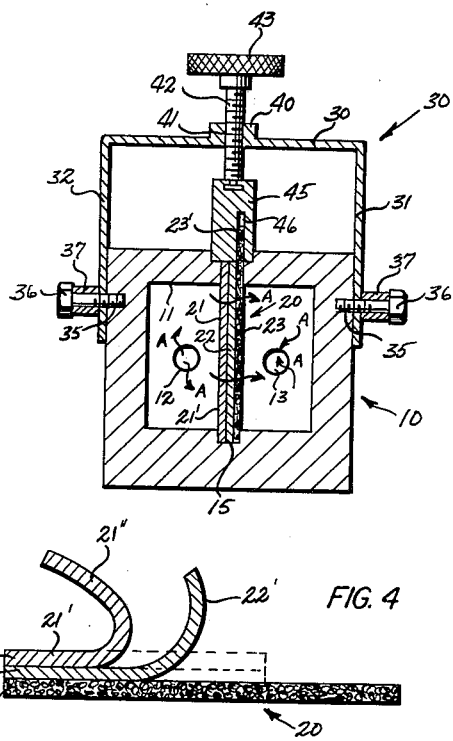
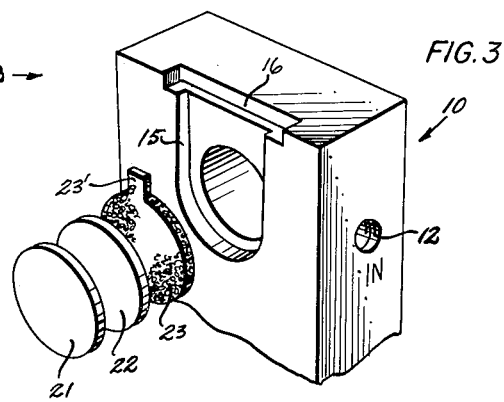
INVENTOR:
Harold A. Price
BY Arthur Middleton
ATTORNEY United States Patent Office 3,049,911
Patented Aug. 21, 1962

3,049,911
CELL FOR TESTING HYDROCARBON FUEL
Harold A. Price, Long Beach, Calif., assignor to Permanent Filter Corporation, Los Angeles, Calif., a corporation of California
Filed Nov. 12, 1959, Ser. No. 852,443
2 Claims. (Cl. 73—61)

The present invention relates to a new and novel cell for testing hydrocarbon fuels and more particularly to a test cell which is adapted to detect the presence of solid contaminants and water which are entrained in the fluid passing through the cell.

The present invention is particularly adapted for testing fuels as utilized in aircraft and guided missiles wherein heavy distillates are employed and the fuels must be as nearly completely free of entrained water and solids as possible in order to provide adequate safety during operation of the aircraft or missiles. The presence of water or submicronic solids in such fuel is critical, since the operation of the jet engines utilizing the fuel is seriously hindered by the presence of water or such solids, and in fact these elements in the fuel can cause the jet engine to become completely inoperative.

The failure of jet engines in flight due to the presence of water or solids in the fuel is obviously a serious matter, and becomes particularly dangerous when the fuels are being employed in commercial aircraft such that the lives of the passengers, in addition to the very valuable equipment, are endangered due to possible failure of the engines. Of course, reliability is also an essential element in guided missiles as used in military operations since failure of the engines completely destroys the tactical effectiveness of such weapons.

As a result of the fairly common failure of jet engines due to the presence of entrained water and submicronic solids, extensive measures have been employed in an attempt to completely eliminate such water and solids from the fuel. Regardless of the efficiency of the initial processing of the fuel, transportation and handling of the fuel often causes additional water and solids to accumulate in the fuel such that when the fuel is actually pumped into an aircraft, for example, the fuel which originally would have been perfectly satisfactory is then not suitable for use. As a result, it is very desirable to provide a simple and efficient means by which the fuel may be quickly and reliably tested in order to determine whether or not the fuel has an excessive amount of water or submicronic solids therein.

The present invention provides a very compact and simple structure for determining the presence of entrained water and submicronic solids in hydrocarbon fuels. Prior art devices for accomplishing this purpose have proved unsatisfactory due to the complexity and relatively large size thereof, and in addition particularly to the requirement of relatively large amounts of water which must be entrained in the fuel in order to obtain accurate results. The present invention provides an arrangement wherein very minute quantities of water which may be entrained in the hydrocarbon fuel are readily detected, and in addition submicronic particles are also effectively separated from the fuel and detected by the test cell according to the present invention.

The new and novel test cell comprises a compact body means which may be assembled and disassembled in a very efficacious manner, and is adapted to be inserted in a suitable manner in a fuel line such that it can accurately sample fuel as it is being pumped from one position to another. In order to provide a respresentative sampling, the test cell is run on a continuous sampling basis or, in other words, it is connected in the main fuel pumping line such that a portion of the fuel passing through the pumping line continuously passes through the test cell. While it is possible to pass the entire fluid flow through the cell, it is considered adequate to merely pass a continuous small percentage of the flow through the test cell in order to obtain accurate sampling.

Test cells for a similar purpose have been designed wherein the fluid to be tested passes through the cell and the indicator means is mounted in such a position that it is impinged upon by the fluid but the fluid does not flow through the indicator means but rather flows in parallel with the indicator means. In contrast to this concept of invention employed in the prior art, a feature of the present invention is that the indicator means is so mounted that the entire flow of fluid must flow through the indicator means itself. It has been found that such flow through gives more improved and more accurate results than prior arrangements.

In order to accomplish the desired flow through arrangement, the present invention employs a body means having a cavity formed therein, an inlet and an outlet being disposed in communication with the cavity. The indicator means is mounted within the cavity such that it is intermediate the inlet and outlet whereby all of the fluid flowing through the cavity must flow through the indicator means. The indicator means itself includes a novel arrangement wherein three separate porous members are employed, each of the members serving a distinct purpose and yet cooperatively performing combined to provide the desired overall effect. The upstream porous member serves a dual purpose itself in, firstly, having a dye impregnated therein which is employed to indicate the presence of water, and secondly, this porous member is provided with an upstream surface which is adapted to indicate the presence of solid contaminants in the fluid passing through the cell.

The intermediate porous member serves a function of providing an indicator which is adapted to receive the dye upon the occurrence of entrained water in the fluid passing through the cell, and which gives a good visual indication of not only the presence of water but the concentration of water which has passed through the cell.

The downstream porous member also performs a dual function in that, firstly, it is of a relatively rigid construction to provide sufficient strength for the indicator means to withstand the force imposed thereon by the flowing fluid such that the indicator means will not be distorted, and, secondly, this downstream member is a water stripper which tends to separate out water passing through the test cell thereby enhancing the possibility of the water contacting the dye included in the upstream porous member. The upstream porous member itself is also formed of a hydrophobic material which serves somewhat as a coalescer means which tends to increase the size of any water droplets to thereby enable the water to more readily deposit the water soluble dye.

The body means is provided with an opening in one of the walls thereof for inserting the indicator means in operative position, and a sealing member is provided for sealing this opening. A support means is mounted on the body means and includes a clamping screw for engaging the sealing member whereby the sealing member may be selectively moved into and out of sealing engagement with the body means.

An object of the present invention is to provide a new and novel cell for testing hydrocarbon fuel which indicates the presence of both water and solid contaminants in fluid passing through the cell.

Another object of the invention is to provide a test cell particularly adapted for testing hydrocarbon fuels and including an indicator means comprising a plurality of porous members so arranged that the entire flow of fluid through the test cell flows through the various porous members.

Yet another object of the invention is the provision of a test cell including indicator means having sufficient strength to withstand the forces imposed thereon by a steam of fluid flowing therethrough.

A still further object of the invention is the provision of a test cell which is quite compact, simple and inexpensive in construction, and yet which is efficient and reliable in operation.

Other objects and many attendant advantages of the invention will become more apparent when considered in connection with the specification and accompanying drawing wherein:

FIG. 1 is an exploded perspective view of certain components of the apparatus;

FIG. 2 is a section taken through the apparatus substantially along line 2—2 of FIG. 1 looking in the direction of the arrows with the apparatus in assembled position;

FIG. 3 is a perspective exploded view taken substantially along line 3—3 of FIG. 1 looking in the direction of the arrows;

FIG. 4 is an enlarged view illustrating the indicator means of the present invention;

FIG. 5 illustrates the test cell connected in a main fuel line;

FIG. 6 illustrates the test cell mounted in a slightly different manner in a fuel line; and FIG. 7 illustrates still another arrangement for connecting the test cell in a fuel line.

Referring now to the drawings wherein like reference characters designate the like parts through the several views, there is shown in FIGS. 1 to 3 a body means 10 having a closed cavity 11 disposed in the central portion thereof. A fluid inlet 12 extends through one wall of the body means and is in communication with a cavity and an outlet 13 also extends through the same wall of the body means and is additionally in communication with the cavity 12. Each of inlet and outlet openings 12 and 13 may be suitably threaded for receiving a fitting formed on the inlet and outlet conduits secured to the test cell.

As seen most clearly in FIG. 3, a slot 15 is formed at an intermediate portion of body means 10, slot 15 surrounding the cavity portion 11 of the body means and providing a space which is adapted to receive the indicator means of the invention. The upper portion of slot 15 is in communication with a rectangular opening 16 formed in the upper wall of the body means. The opening 16 extends around the upper end of slot 15 so as to provide a shoulder portion 17 which is adapted to engage a sealing member as hereinafter described for effectively sealing the opening and the upper portion of the slot when the indicator means is in operative position.

Referring now to FIG. 4 of the drawing, the construction of the indicator means is illustrated. The indicator means is given generally the reference numeral 20, this indicator means comprising three separate porous members 21, 22 and 23 which are disposed in abutting relationship when in operative position. For the purpose of convenience, these porous members are glued together by a suitable bonding agent so that they can be inserted and removed from the test cell as desired. A suitable substance for securing the members together is a bonding agent sold under the trade name Pliobond manufactured by the Goodyear Tire and Rubber Company of Akron, Ohio.

Porous member 21 is disposed upstream when the indicator means is in operative position, member 21 being formed of a suitable porous material such as paper which is hydrophobic and which has coalescing characteristics such that it tends to cause any water droplets entrained in the fluid passing therethrough to merge with one another and thereby propagates the growth of such droplets.

A suitable substance for this purpose is bora silicate glass paper identified as 934–AH manufactured by the Hurlburt Paper Company. This paper also traps solid particles of submicronic size. A further feature of member 21 is that the upstream surface 21' thereof is of a light color and ordinarily is crystal white such that it will disclose the presence of any solid contaminants which may be separated out from the fluid and deposited thereon.

The downstream surface 21'' of porous member 21 is impregnated with a suitable dye which is water soluble and which is inert to hydrocarbons. Porous member 21 is preferably not impregnated all the way through the thickness thereof but only through a portion thereof and particularly on surface 21'' which, when in operative position, is in abutting relationship with surface 22' of the adjacent porous member. A suitable dye which may be impregnated in porous member 21 along the surface 21'' thereof is a dye identified as "Calcocide Blue Black Extra Concentrated" manufactured by the American Cyanamid Company of Bound Brook, New Jersey.

The intermediate porous member 22 is also preferably formed of paper and has hydrophilic characteristics. A cotton cellulose paper is particularly adapted for use in this location since it is adapted to receive and absorb any dye which may be removed from porous member 21 during operation by water droplets passing through the indicator means. An example of a suitable paper from which porous member 22 may be constructed is a paper identified as Watman No. 12, manufactured by W & R Balston Ltd., of England.

The third porous element 23 is of a relatively rigid construction to provide sufficient strength for backing up members 21 and 22 to support them as the fluid flows therethrough. In addition, porous member 23 is so constructed as to aid in the separation of water from the fluid passing therethrough. To obtain the desired results, member 23 is preferably formed of sintered bronze spheres held together at mutual tangential points of contact. These spheres have a diameter of approximately 40 microns and there are about 40% voids in the body of the filter.

Referring again to FIG. 3, it will be noted that porous members 21 and 22 are provided with a substantially circular configuration such that they fit relatively snugly within slot 15 and project radially beyond the outer periphery of cavity 11 when in operative position. Porous element 23 is also provided with a main body portion which is substantially circular and an offset portion 23' extending radially therefrom, this offset portion extending upwardly through opening 16 provided in the housing for facilitating insertion and removal of the indicator means with respect to the body means.

Referring again to FIGS. 1 and 2 of the drawings, a substantially U-shaped yoke member 30 includes downwardly extending legs 31 and 32 joined by a cross member 33. A pair of openings 35 are provided in the opposite side walls of the housing, and a pair of threaded bolts 36 are mounted therein, bushings 37 being disposed about bolts 36 and being disposed between the heads of the bolts and the associated leg portions of yoke 30. In this manner the yoke is supported upon the housing, and at the same time, it may be readily loosened for swinging movement with respect thereto or for removal when desired.

The central part of cross member portion 33 is provided with an enlarged boss 40 having a threaded opening 41 extending therethrough. A clamping screw 42 is threaded through opening 41 and is provided with an enlarged head portion 43 which is knurled such that it can be manually engaged for turning the screw. The lower end of screw 42 extends within and is secured to a sealing member 45, the lower portion of sealing member 45 being shaped such that it fits snugly within opening 16 provided in the upper wall of the body means 10. Sealing member 45 is provided with a slot 46 therein which receives the offset portion 23' of porous member 23. It is evident that when the apparatus is in the position shown in FIG. 2, the indicator means is mounted in operative position and the slot and opening formed in the housing is sealed such that no fluid can leak outwardly of the housing past sealing member 45.

It is evident from an inspection of FIG. 2 of the drawing that fluid entering the cavity 11 in the body means 10 through inlet 12 will follow a path as indicated by arrows A such that the entire amount of the fluid which passes through the cavity will flow directly through the indicator means. Any solid contaminants which exist in the fluid stream will be deposited on the upstream surface 21' of porous member 21, and any water which exists in this stream will cause the water soluble dye impregnated on the downstream surface of porous member 21 to be deposited on the intermediate porous member 22. As mentioned previously, member 21 performs a coalescing action on the water droplets to increase their size such that the efficiency of the operation is improved, and the downstream porous member 23 also assists in blocking the flow of water through the indicator means to insure that the water engages the dye impregnated in porous member 21.

After a predetermined amount of fluid has passed through the test cell, clamping screw 42 may be backed off and the yoke may be swung out of the way to remove sealing member 45 from its sealing position thereby gaining access to the indicator means. The indicator means may be withdrawn by grasping portion 23' of porous member 23. The two porous papers 21 and 22 may then be peeled away from porous member 23. Any solid contaminants which have been deposited on member 21 will then appear on the upstream surface 21' thereof. An inspection of the upstream surface of the intermediate porous member 22 will indicate whether any water has passed through the indicator means since the dye will be deposited thereon. Porous member 23 can then be cleaned and two new porous members 21 and 22 associated therewith whereupon the indicator assembly may again be inserted within the body means and sealing member 45 returned to its operative position for another test run.

Referring now to FIG. 5 of the drawing, a test cell according to the present invention is indicated generally by the reference numeral 50 and is connected in a fuel pumping line 51, the fuel flowing therethrough in the direction indicated by the arrows. A valve 52 is provided in the fuel line, and the pressure drop occurring between the two points 53 and 54 to which the test cell is connected in the pumping line is sufficient to cause flow of fuel through the test cell whereby a continuous sampling will be performed of the fuel passing through the main pumping line.

Referring now to FIG. 6, another arrangement is disclosed wherein the test cell is indicated generally by the reference numeral 60 and is connected to a fuel pumping line 61. The conduits connected to the test cell are connected to flanges 62 and 63 which are formed about the fuel line, the fuel flowing in the direction indicated by the arrows. A standard orifice plate 65 is connected in the fuel line to provide a pressure differential sufficient to cause the desired amount of flowing of fuel through the test cell.

Referring now to FIG. 7 of the drawing, a test cell according to the present invention is indicated generally by the reference numeral 70, the test cell being connected to a main fuel line 71. The fuel flows in the direction indicated by the arrows, and the inlet of the test cell is connected to the fuel line, the outlet of the test cell being connected to a separate container (not shown).

It is apparent from the foregoing that there is provided a new and novel test cell which is especially adapted for testing hydrocarbon fuels, the test cell including an arrangement which is adapted to indicate the presence of solid contaminants as well as entrained water in the fuel. The indicator means of the invention is mounted in such a manner that the entire amount of fluid flowing through the test cell passes through the indicator means, and the indicator means is so constructed as to have sufficient physical strength to withstand the forces imposed by the fluid flowing therethrough and to prevent distortion during operation of the apparatus.

In a structure according to the present invention, it is quite compact, simple in construction, inexpensive and yet is efficient and reliable in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A cell for testing hydrocarbon fuels comprising a body means having a cavity formed therein, said body means having an inlet and an outlet in communication with said cavity, a slot formed in the inner wall of said body means substantially surrounding said cavity for receiving an indicator means, the indicator means comprising a plurality of porous members of relatively flat construction disposed in abutting relationship with one another, an upstream one of said porous members comprising a hydrophobic material which is at least partially impregnated with a water soluble dye which is inert to hydrocarbons, an intermediate one of said porous members comprising a hydrophylic material adapted to receive said dye and indicate the presence of water when water passes through the test cell, a downstream one of said porous members comprising a relatively rigid member formed of metallic material, an opening formed in said body means, said slot means being in communication with said opening for inserting and removing the indicator means of the device, and a sealing member for sealing said opening during operation of the apparatus, said indicator means being disposed within said cavity such that the stream of flow passing between said inlet and outlet passes through said indicator means during operation of the cell.

2. Apparatus as defined in claim 1 including a yoke member supported by said body means, an adjustable clamping screw supported by said yoke member, said clamping screw engaging said sealing member for selectively moving the sealing member into and out of sealing engagement with the body means.

References Cited in the file of this patent
UNITED STATES PATENTS

| | | |
|---|---|---|
| 2,553,472 | Quinn | May 15, 1951 |
| 2,672,431 | Goetz | Mar. 16, 1954 |
| 2,844,025 | Joyce et al. | July 22, 1958 |
| 2,970,468 | Price | Feb. 7, 1961 |